UNITED STATES PATENT OFFICE.

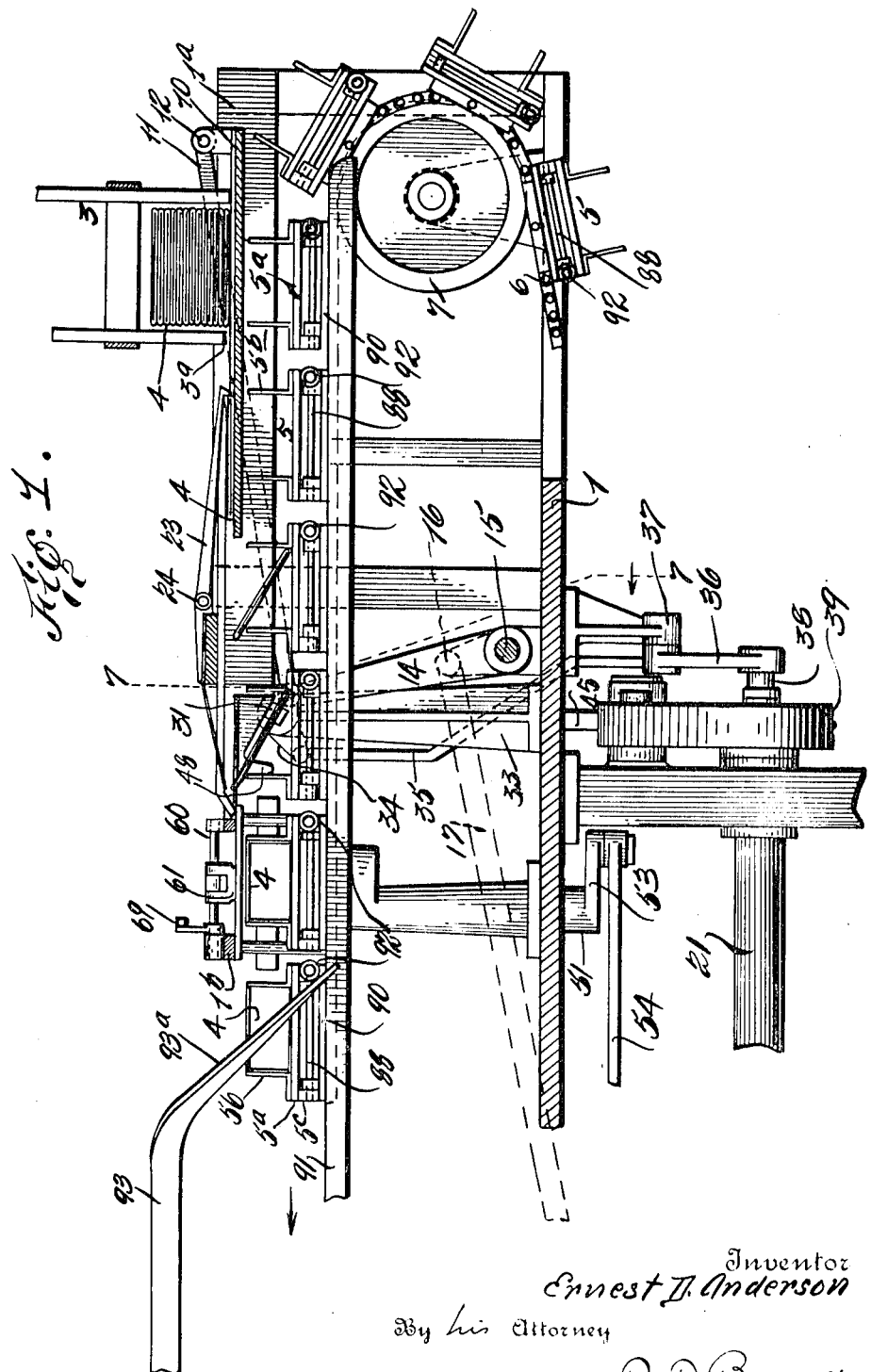

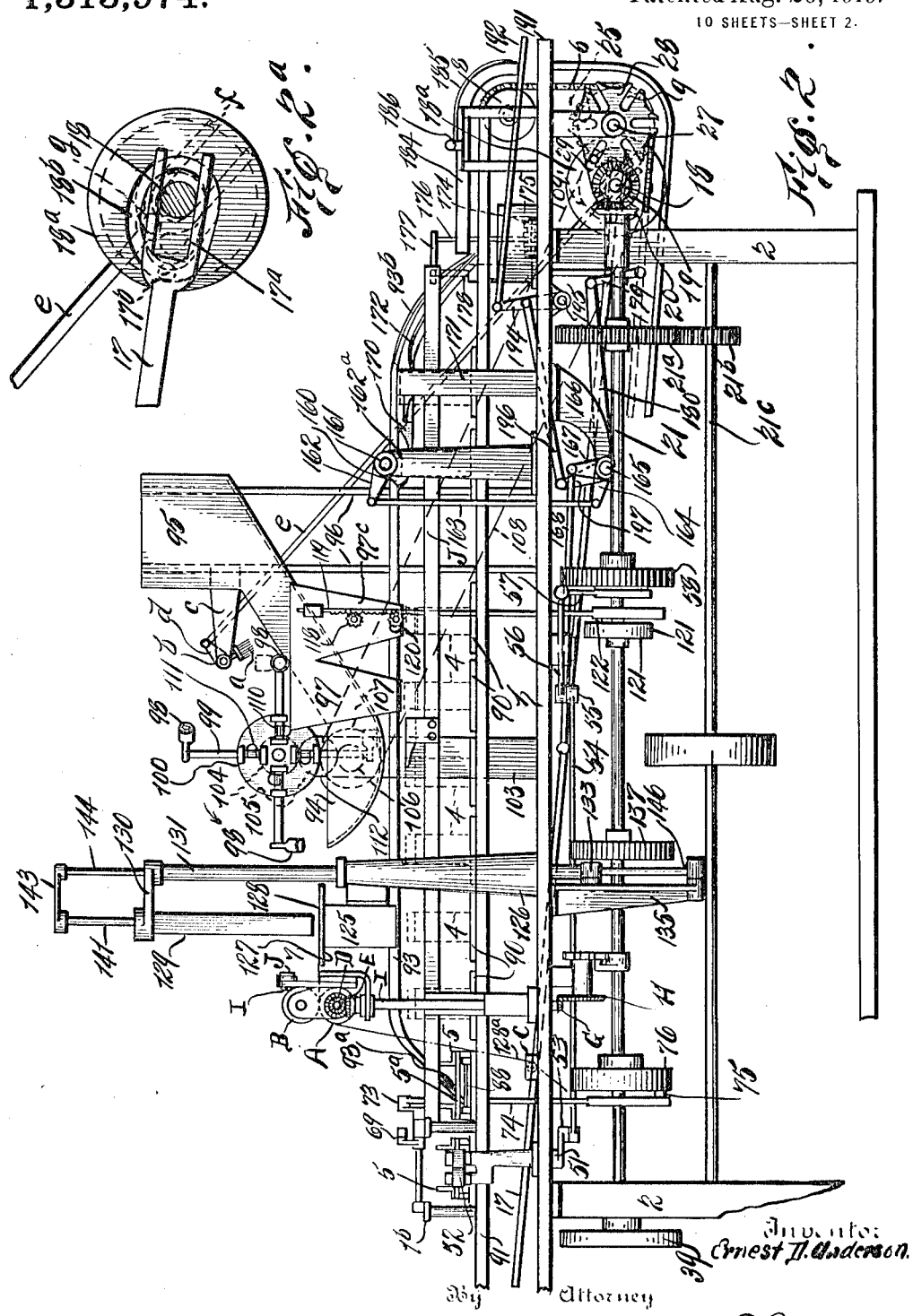

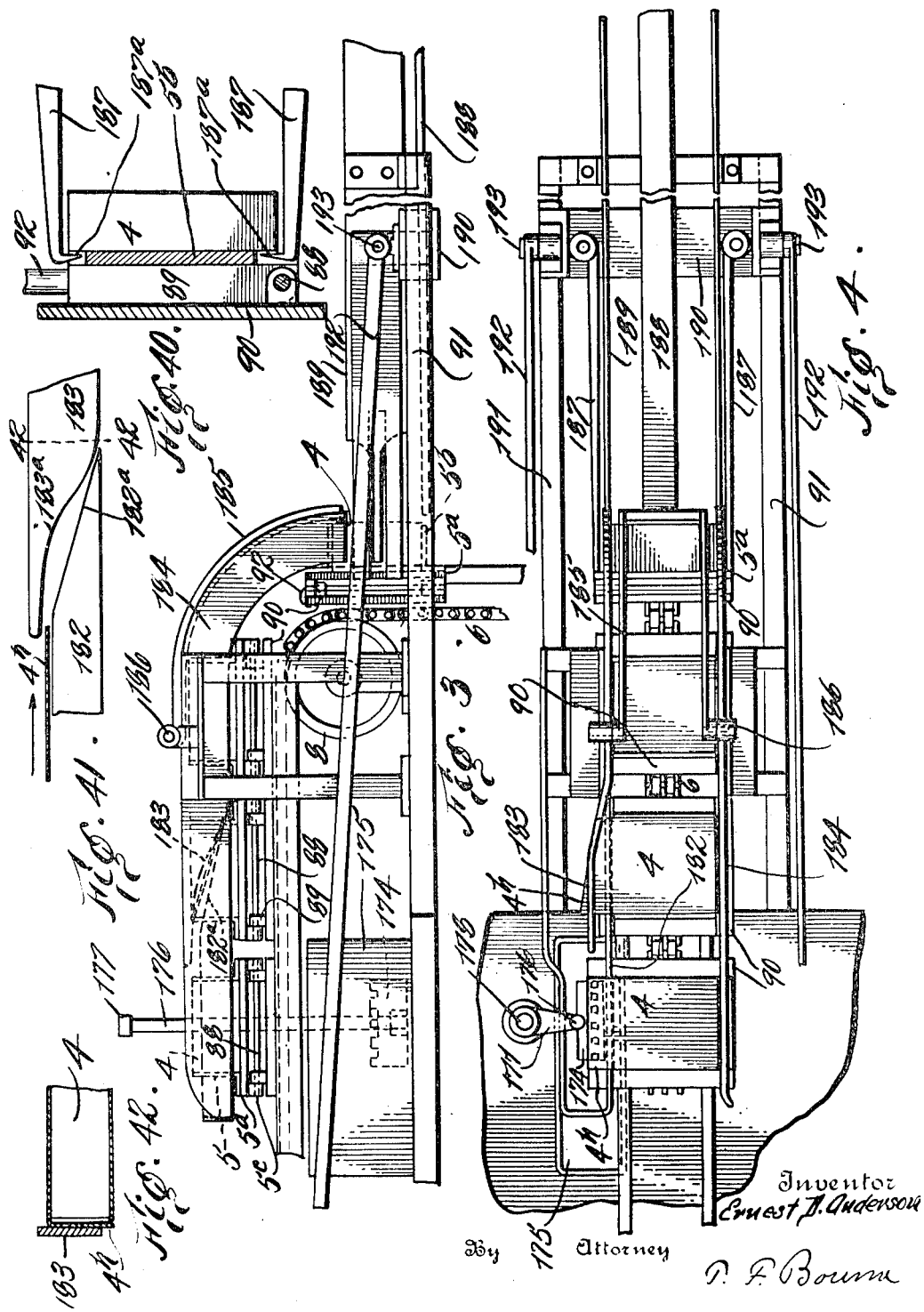

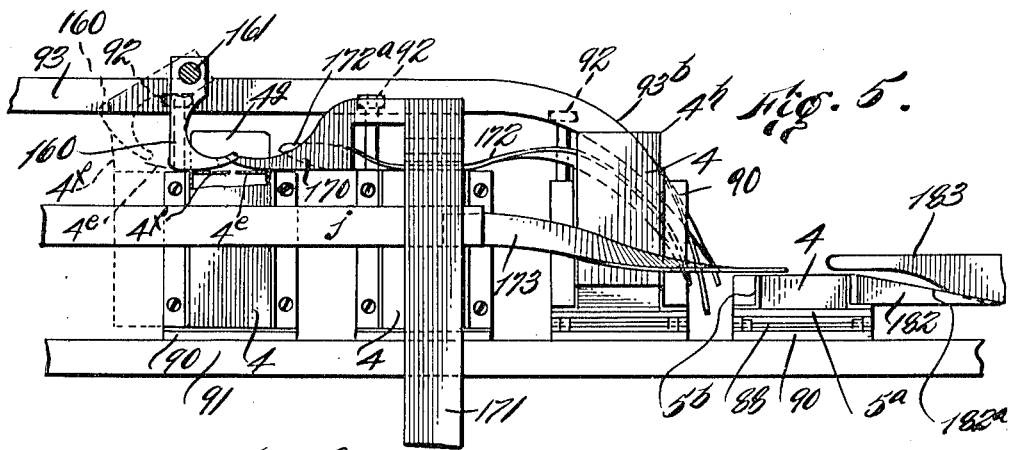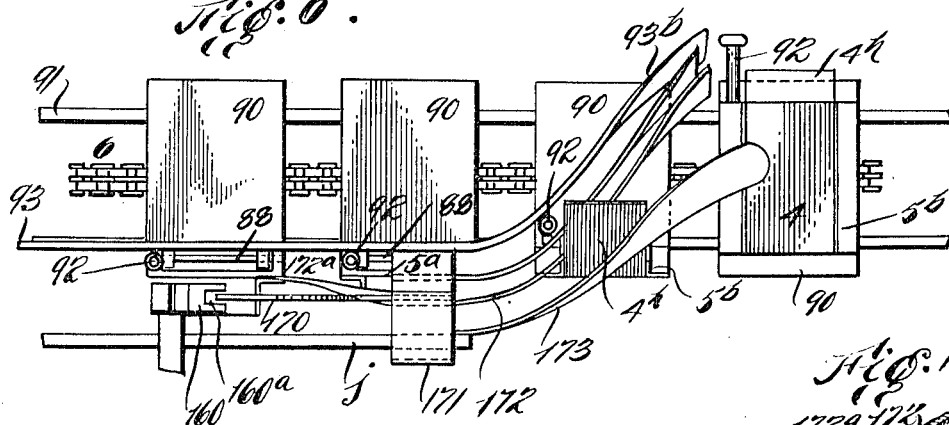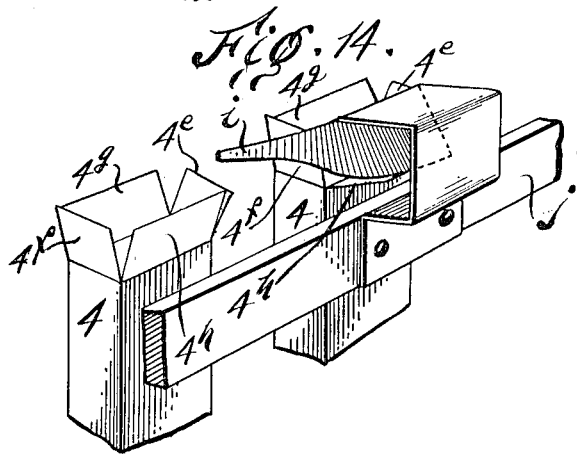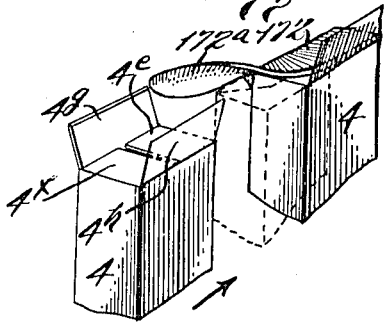

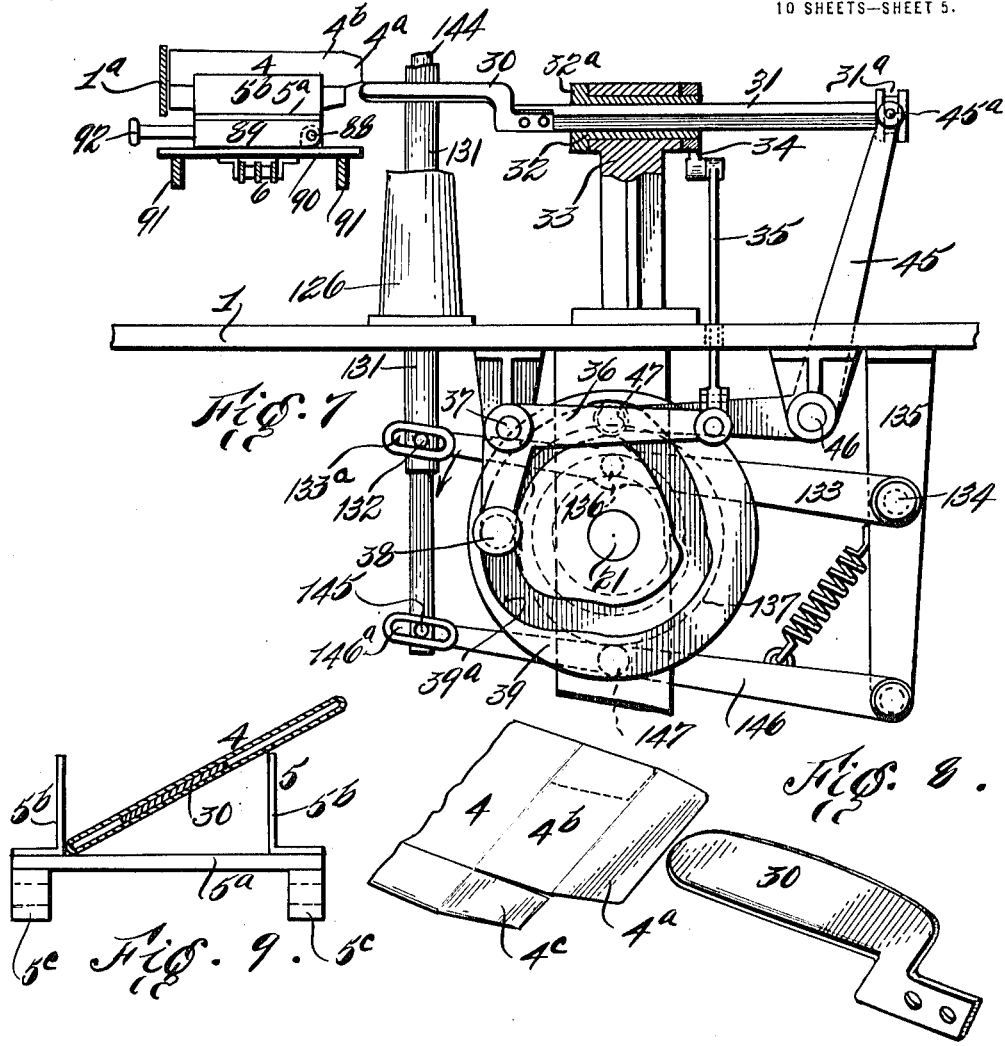

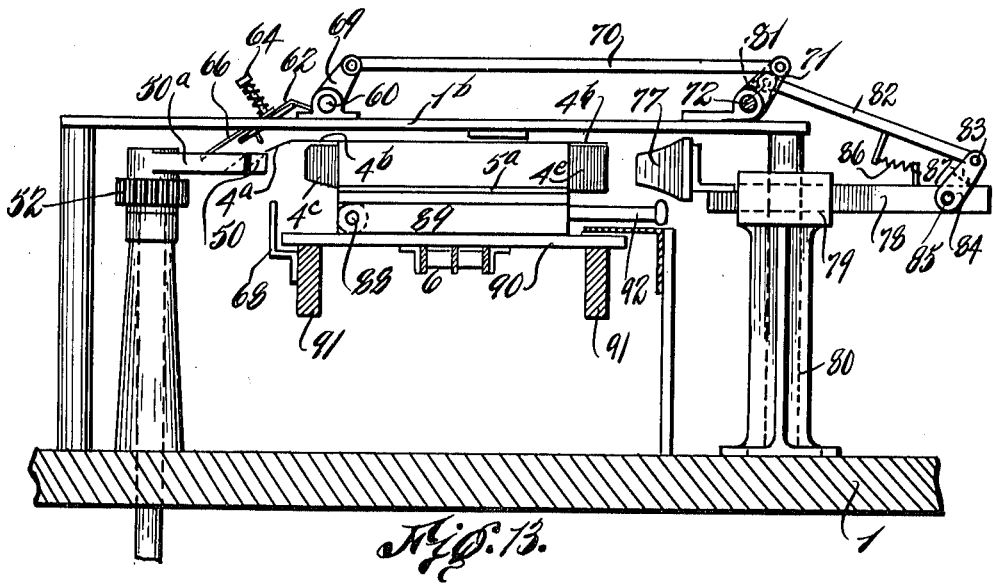

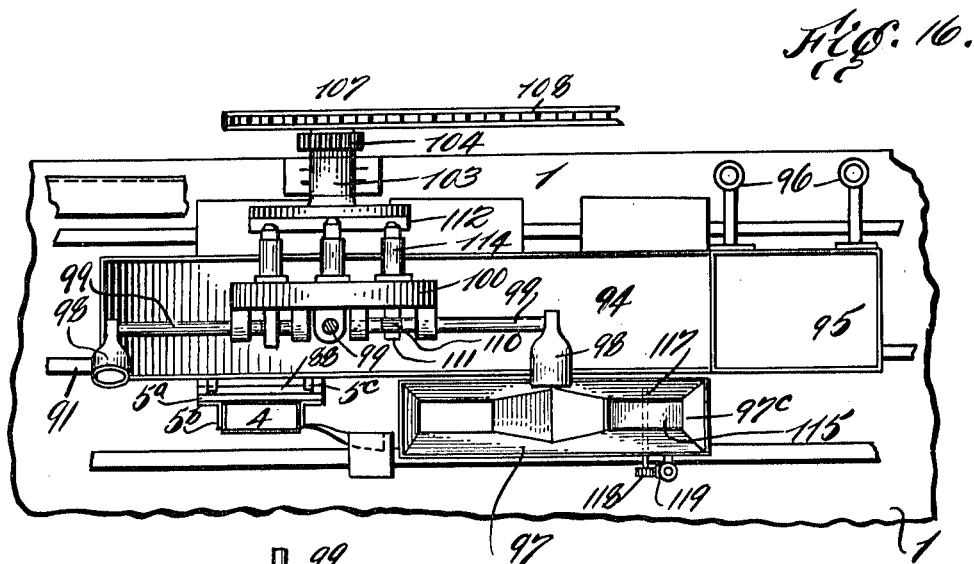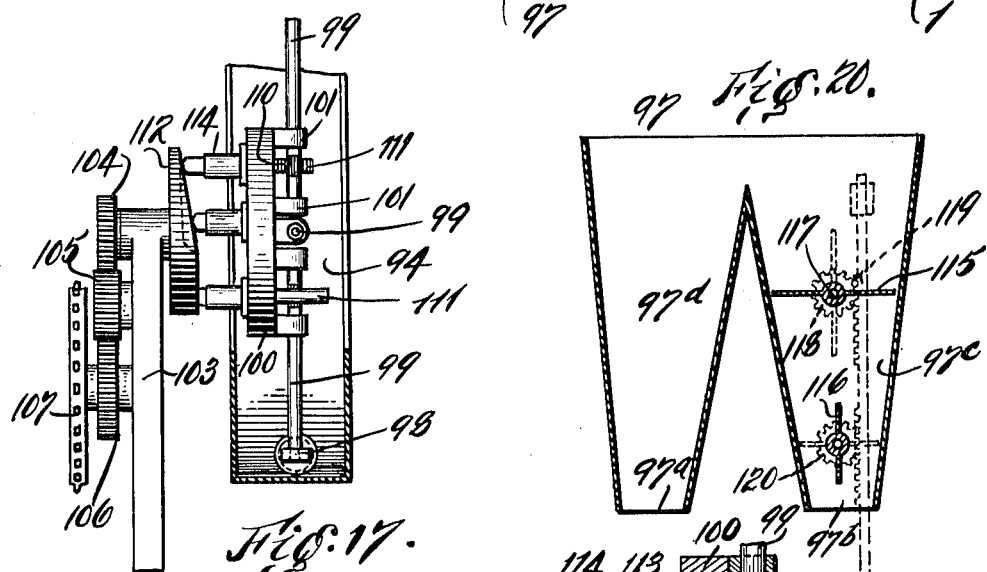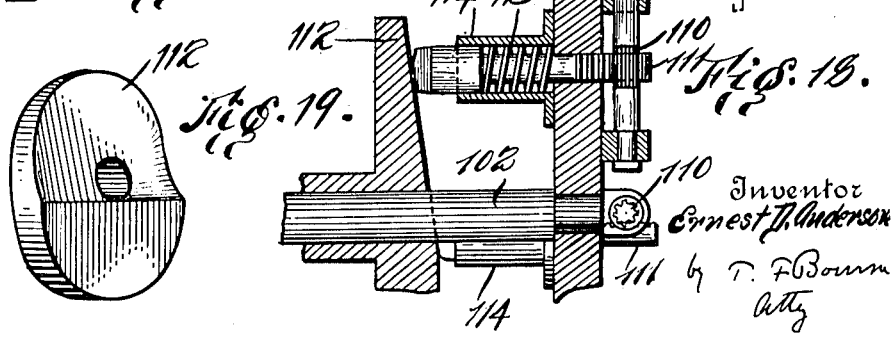

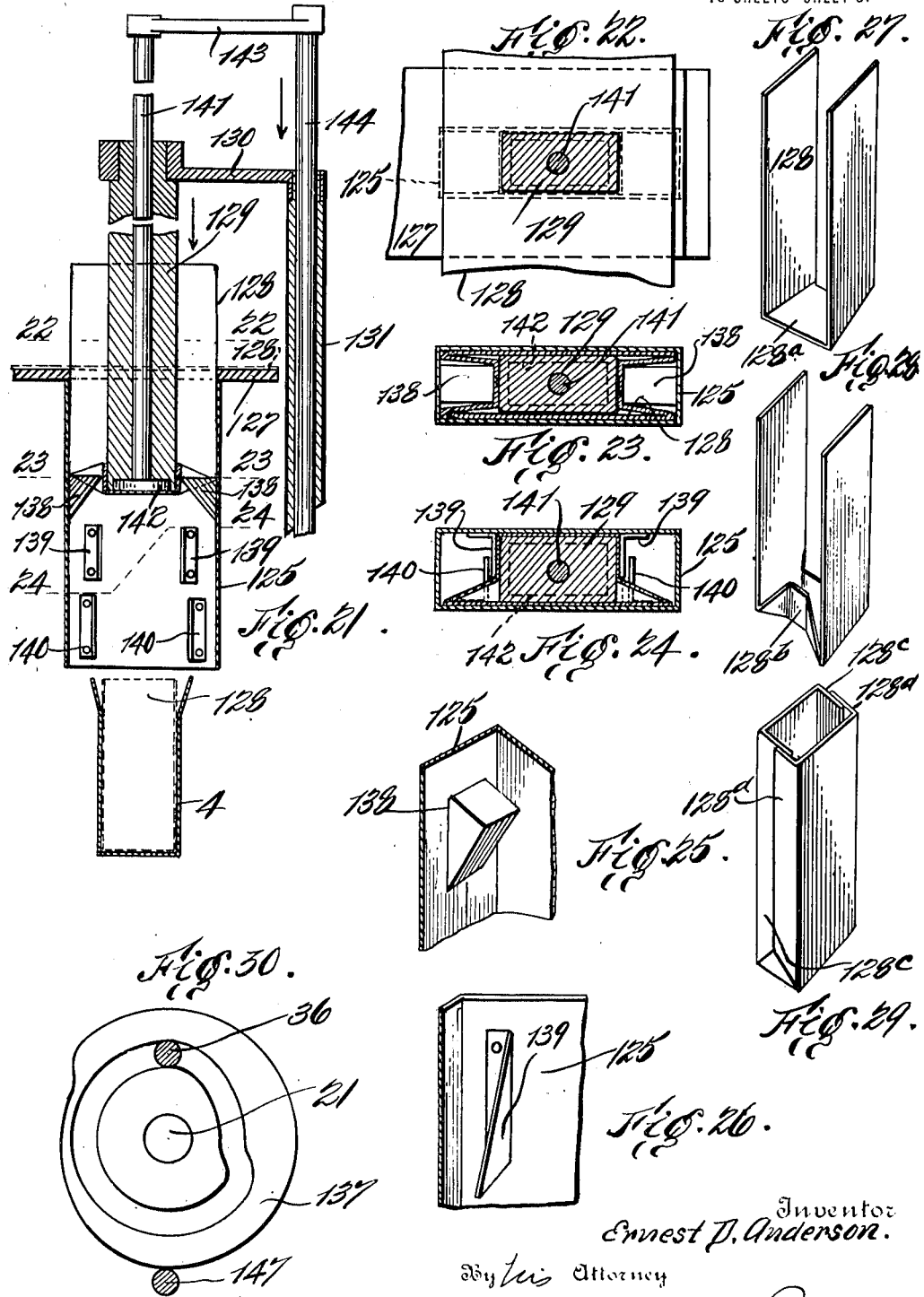

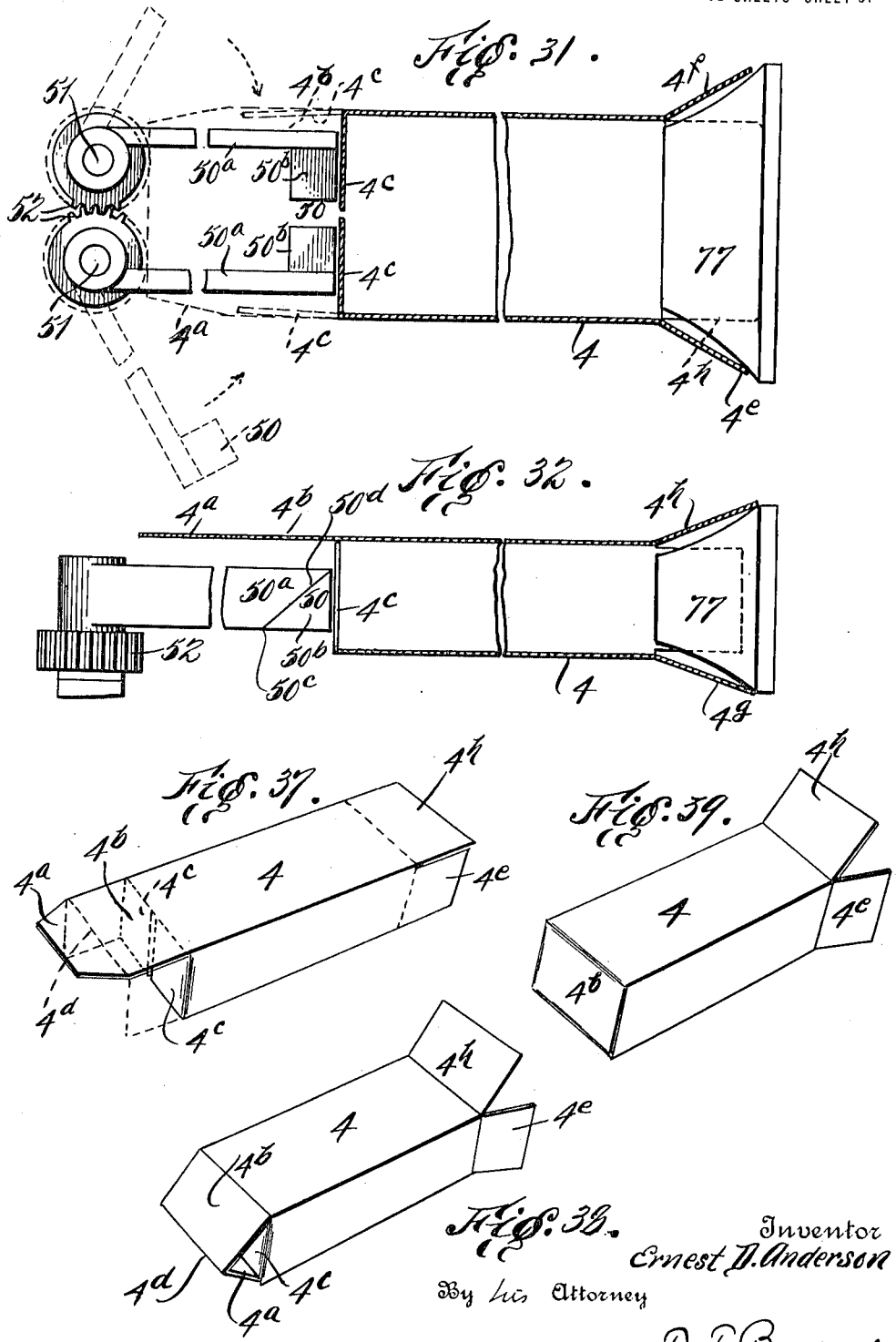

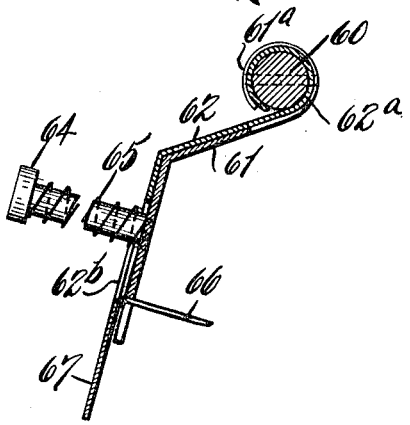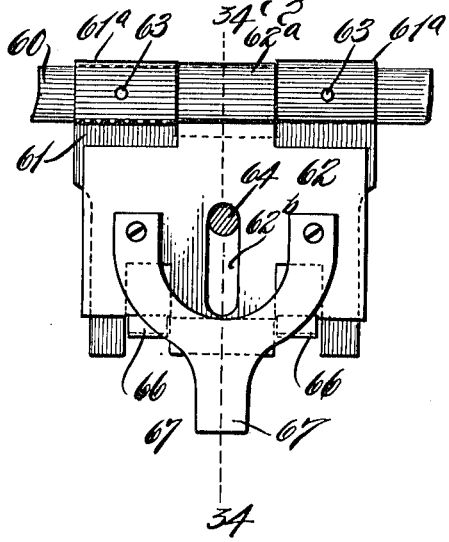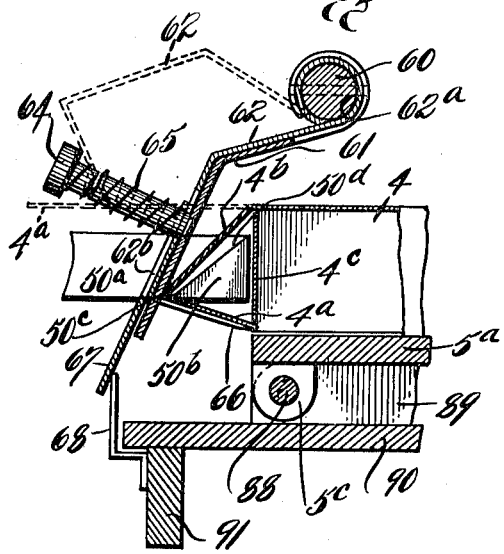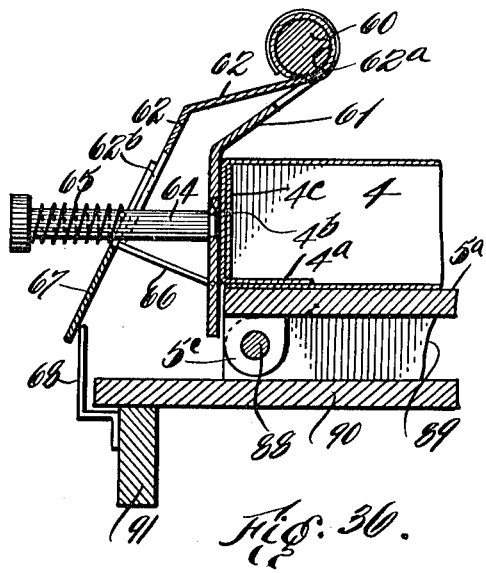

ERNEST D. ANDERSON, OF NEW YORK, N. Y.

MACHINE FOR PACKING ARTICLES.

1,313,974.  Specification of Letters Patent.  Patented Aug. 26, 1919.

Application filed March 21, 1917. Serial No. 156,297.

*To all whom it may concern:*

Be it known that I, ERNEST D. ANDERSON, a citizen of the United States, and resident of New York city, in the county of New York and State of New York, have invented certain new and useful Improvements in Machines for Packing Articles, of which the following is a specification.

My invention relates to improvements in machines for making packages of goods, such as for opening, charging and closing cartons. One of the objects of my invention is to provide improved means for opening collapsed cartons while they are in a substantially horizontal position, closing flaps at corresponding ends of the opened cartons, turning the opened cartons to a substantially vertical position ready to receive contents, closing other flaps, and restoring the charged cartons to a substantially horizontal position for delivery from the machine.

My invention comprises improved means for closing flaps at corresponding ends of horizontally disposed cartons before they are turned to an upright position, and to improved means for closing flaps at the other ends of charged cartons during their progress through the machine to the delivery end.

Another object of my invention is to provide improved means to pick up loose articles, or articles in bulk, such as candies, and deposit them in containers, such as cartons, and included in this object are means to expedite the filling or charging of such containers.

Another object of my invention is to provide improved means for lining opened cartons previous to depositing articles therein.

In the organization of the machine illustrated in the accompanying drawings I have shown means to supply horizontally disposed collapsed cartons successively from a magazine to receivers of a conveyer, means to open such cartons, means to close flaps at corresponding ends of the cartons and to tuck one of the flaps of such carton in the said end thereof, means to turn such cartons in an upward direction with their open ends extending upwardly, means to apply linings in the cartons when desired, means to successively charge the cartons with loose or bulk articles, and means to close flaps at the said open ends of the charged cartons; also means to restore the charged cartons to a substantially horizontal position, means to close and seal flaps at the receiving ends of the cartons, and means to deliver the charged and sealed cartons from the machine. In this connection it may be stated that means for supplying linings within the cartons may be not used or omitted in case it is not desired to line the cartons.

My invention also comprises novel details of improvement and combinations of parts that will be more fully hereinafter set forth and then pointed out in the claims.

Reference is to be had to the accompanying drawings forming part hereof, wherein, Figure 1 is a partly sectional side view of a portion of the machine illustrating carton delivering and opening means; Fig. 2 is a side view of a further portion of the machine extending from the righthand side of Fig. 1 and looking from the opposite side of the machine, hence Figs. 1 and 2 may be read together, considering the lefthand end of Fig. 2 reversed in position and connected with the lefthand end of Fig. 1; Fig $2^a$ is a detail sectional view illustrating cam means for actuating different devices of the machine; Fig. 3 is an enlarged side elevation of flap pasting, folding and carton ejecting mechanism, part of which is illustrated at the righthand side of Fig. 2; Fig. 4 is a plan view of Fig. 3; Fig. 5 is an enlarged side elevation, illustrating final flap folding and other devices located adjacent to the discharge end of the machine; Fig. 6 is a plan view of Fig. 5; Fig. 7 is an enlarged view, partly in section substantially on the line 7, 7, in Fig. 1, illustrating means for opening collapsed cartons, a portion of the means for operating the devices that place linings in the cartons also being illustrated; Fig. 8 is a diagrammatic perspective view illustrating a portion of the opener and a portion of an opposing collapsed carton; Figs. 9, 10 and 11 are enlarged views, partly in section, illustrating steps in opening collapsed cartons; Fig. 12 is an enlarged plan view illustrating means for folding flaps to close the ends of the opened cartons before they are charged, means for flaring or spreading flaps at the opposite ends of the cartons also being illustrated in said figure; Fig. 13 is a cross section substantially on the line 13, 13, in Fig. 12; Fig. 14 is an enlarged detail perspective view illustrating means for bending outwardly flaps of the cartons on one side thereof before the cartons are charged; Fig. 15 is a detail perspective illustrating means to close side flaps on the cartons opposite the flaps bent outwardly by the device shown in Fig. 14; Fig. 16 is an enlarged plan view of a portion of the machine illustrating means for charging or filling opened cartons; Fig. 17 is a fragmentary partly sectional edge view illustrating charging mechanism for the cartons; Fig. 18 is an enlarged detail sectional view of a portion of the devices shown in Fig. 17; Fig. 19 is a detail perspective view of the fixed cam plate of the devices referred to respecting Figs. 16, 17 and 18; Fig. 20 is an enlarged detail vertical section through the filling or charging funnel or spout, illustrating the valves or gates in one leg thereof; Fig. 21 is an enlarged vertical sectional view illustrating means for folding and inserting linings in cartons; Figs. 22, 23 and 24 are enlarged cross sections taken respectively substantially on the lines 22, 22, 23, 23 and 24, 24, in Fig. 21; Figs. 25 and 26 are fragmentary perspective views illustrating folding elements for the bottom and sides of the linings; Figs. 27, 28 and 29 are perspective views illustrating steps of folding a strip or sheet for a lining for the cartons; Fig. 30 is a detail view of the cam for operating the plunger and lining stripper illustrated in Fig. 21, which cam is also indicated in Fig. 8; Fig. 31 is a diagrammatic, partly sectional, plan view illustrating means for closing end flaps at the ends of the cartons first to be closed, and means for flaring or spreading flaps at the opposite ends of such cartons; Fig. 32 is a partly sectional side view of Fig. 31; Fig. 33 is a face view, illustrating means for folding and tucking flaps for the ends of the cartons which are first closed; Fig. 34 is a section on the line 34, 34, in Fig. 33; Fig. 35 is a sectional view, in part substantially corresponding to Fig. 32, illustrating a step in closing and tucking one of the last named flaps; Fig. 36 is a similar view illustrating a further step in tucking said flaps; Figs. 37, 38 and 39 are diagrammatic perspective views illustrating the several steps of folding, tucking and spreading flaps referred to with respect to Figs. 31 to 36; Fig. 40 is an enlarged fragmentary sectional view illustrating the carton ejecting fingers; Fig. 41 is a diagrammatic view illustrating means for folding the final flaps of the cartons; Fig. 42 is a cross sectional view on the line 42, 42, in Fig. 41, illustrating the final flap folded against previously folded flaps of a carton.

The machine is provided with a main frame of any suitable construction, indicated generally at 1, and shown supported upon legs 2, and at 3 is a magazine suitably supported upon frame 1 and shown near one end thereof, (Fig. 1). Said magazine is adapted to contain horizontally stacked up collapsed cartons or containers 4 having flaps at their ends (Figs. 1 and 9). Means are provided to feed the collapsed cartons successively to receivers or pockets 5 of a conveyer. I have shown the conveyer in the form of a chain 6 carried upon wheels 7, 8, 9 journaled at opposite ends of frame 1 (Figs. 1 and 2). Means are provided to feed or deposit the cartons successively in the receivers or pockets of the conveyer, and to cause the latter to operate step by step. Beneath magazine 3 I have shown a plate 10 (Fig. 1) which is suitably guided upon frame 1 to reciprocate, the forward lower corner of the magazine at $3^a$ permitting the cartons to pass thereunder one by one. Feed plate 10 may have suitable well known means to push the lowest carton from the magazine, and may be reciprocated by any suitable means, such as by a link 11 pivotally connected with said plate at 12 and pivotally connected with a rock arm 14, shown carried by a shaft 15 journaled upon frame 1, which shaft is pivotally connected by an arm at 16 with a rod or link 17, the opposite end of which link is shown forked at $17^a$ to receive a shaft 18 suitably journaled upon frame 1 (Figs. 1, 2 and $2^a$). Shaft 18 is shown provided with a gear 19 in mesh with a gear 20 secured on shaft 21 that is journaled in suitable bearings in frame 1 and which may be rotated in any suitable manner, as by gearing $21^a$, $21^b$ operated from power shaft $21^c$ (Fig. 2). A cam $18^a$ on shaft 18 is shown provided with a cam groove $18^b$ receiving projection or pin $17^b$ from rod 17 whereby the latter may be reciprocated (Fig. $2^a$). Above delivery plate 10 one or more hooks or fingers 23 may be located, and pivotally supported upon the main frame at 24, in position to engage the rear edges of the cartons as fed on plate 10. The finger or fingers 23 are located in position over receivers 5, whereby when plate 10 advances a carton 4 from beneath the magazine said carton will be moved beyond the hooked end of finger or fingers 23, as indicated in Fig. 1, and then, when plate 10 next returns, said finger or fingers will retain the carton and the plate will slide thereunder, whereupon the carton will drop into the receiver 5 then at rest beneath it, and the carton will assume the position in the receiver indicated in Figs. 1 and 9. The conveyer may be operated step by step to advance the receivers and cartons toward the left in Fig. 1, and correspondingly toward the right in Fig. 2 by any suitable means. I have shown a sprocket wheel 25 receiving the chain 6 (Fig. 2) and secured upon a shaft 27 journaled upon frame 1, to which shaft is secured a member 28 of a Geneva movement, the opposite member of which may be in the form of an arm 29 provided with a projection operative in the slots of member 28 in a well known manner, said arm being secured upon shaft 18, whereby as said shaft rotates continuously the conveyer will be operated step by step.

The cartons 4 are shown provided with flaps at opposite ends, and they are adapted to travel between spaced abutments 1ᵃ extending at opposite ends of the cartons for a suitable distance in a well known manner (Figs. 1 and 7). I provide means to open and seat the cartons in the receivers or pockets of the conveyer, for which purpose I have shown a longitudinally movable and rotative opener 30. Said opener is shown in the form of a suitable blade secured upon a longitudinally movable rod 31, that is shown in angular section and adapted to reciprocate in a bearing or bushing 32 that is journaled in a support 33 secured on frame 1 (Figs. 1 and 7). Said bearing or bushing is shown provided with a flange or head 32ᵃ at one end, and at the opposite end said bearing is secured to crank arm 34 shown pivotally connected by a link 35 with a rock arm or bell-crank lever 36 journaled at 37 upon a bracket secured to frame 1. Said lever 36 is shown provided with a projection or roller 38 adapted to operate in the cam groove 39ᵃ of cam 39 that is secured upon shaft 21. Rod 31 is shown provided with an annular groove 31ᵃ receiving the forked end 45ᵃ of a rock arm or lever 45, pivotally supported at 46 upon frame 1, which rock arm is provided with a projection or roller 47 adapted to operate in cam groove 39ᵃ of cam 39 (Fig. 7). The relative arrangement of cam 39 and levers 36 and 45 is such that rod 31 and opener 30 will be retracted from the cartons when they are being advanced by the conveyer 6, but the tip end of the opener will be in the path of travel of the tuck ends 4ᵃ of flaps 4ᵇ of the cartons to slightly spread the same, substantially as a carton comes to rest opposing the opener, and when the carton is at rest cam 39 will cause rod 31 and opener 30 to advance and insert the opener in the carton (Figs. 8 and 9) by first causing lever 45 to rock and to come to rest, and thereupon cam 39 will cause lever 36 to operate, whereupon arm 34 will rock the bearing or bushing 32, correspondingly rocking or rotating the opener 30 within the carton, which will bear against the lower side of the carton and cause its upper portion that is resting upon one side of the receiver 5 (Fig. 9) to be dragged therefrom to square and seat the carton in the receiver (Fig. 10). Cam 39 will then next cause opener 30 to rock reversely a suitable distance to relieve the carton from the pressure of the opener, substantially as indicated in Fig. 11, and then said cam will cause continued rotative movement of lever 36 to return the opener to its normal position respecting the collapsed cartons, and will cause lever 45 to withdraw the opener from the opened carton, without disturbing the latter in its receiver 5, restoring the opener in position to enter the succeeding collapsed carton presented by the conveyer in front of the opener, and so on for each collapsed carton to be opened. When the cartons are advanced about to the opener receiving position, they may engage a stop or the like 48, just before the conveyer comes to rest, to cause the cartons successively to be snugged in the receivers 5 in position to receive opener 30 (Fig. 1).

In the accompanying drawings means are shown for closing the flaps at one end of the cartons and for tucking into the cartons the tuck ends 4ᵃ thereof before the cartons are charged or filled, and to accomplish such purpose I provide means which may be described as follows: After each carton has been opened and the opener 30 has been withdrawn therefrom, the conveyer moves one or more steps and comes to rest with an opened carton in position opposite means adapted to first close in the end flaps 4ᶜ and to then close the side flap 4ᵇ and tuck its end 4ᵃ into the carton. At 50 are flap closers located in stepped relation beyond opener 30, and shown comprising arms 50ᵃ having projections 50ᵇ (Figs. 12, 13, 31, 32, and 35), adapted to swing into position to close in the then outwardly projecting flaps 4ᶜ. Since two flaps 4ᶜ are shown on each carton there are two flap closers 50 spaced apart and normally located in such position as to permit the flaps 4ᶜ to pass the nearest one (Fig. 12). The arms 50ᵃ are pivotally supported upon rock shafts or studs 51 suitably journaled upon frame 1, gears 52 intermeshing and connected with said shafts serving to cause joint to and fro movements of said flap closers when either of said shafts is rocked (Figs. 12 and 13). One of the shafts 51 is shown provided with a crank arm 53 (Figs. 1 and 2) pivotally connected with link or rod 54, which in turn is connected with a lever or the like at 55 suitably carried by frame 1, which lever is connected by a link 56 with an arm 57 operated by a cam 58 on shaft 21. The parts are so timed that when a carton having outwardly extending flaps comes to rest opposing the flap closers 50, the latter will move toward each other to close in said flaps (Fig. 31) and said closers will remain temporarily in the flap closing position while the flap 4ᵇ is being closed over the closed flaps 4ᶜ. I have shown means operative in conjunction with the closed flap closers 50 for bending the tuck ends 4ᵃ of flaps 4ᵇ in position to enter the cartons, and for closing in such flaps, means for such purpose being shown more particularly in Figs. 1, 12, 13, 44, 34, 35 and 36. Suitably supported upon braces 1ᵇ, spaced above the conveyer, is a shaft 60 which carries a two-part flap folder and tucker, shown comprising an inner member 61 and an outer member 62. The inner member 61 is secured to shaft 60, as by one or more pins 63 passing through tongues 61ᵃ shown coiled around the shaft (Fig. 33), and the outer member is swiveled on said shaft, being shown supported thereon by a tongue 62ᵃ struck from the metal of member 62 and coiled around the shaft. The members 61 and 62 are adapted to operate together for a certain distance and then member 62 will be brought to rest and member 61 will continue to operate for a farther distance. I have shown spring-acting means normally retaining said members together and permitting one to move relatively with relation to the other, for which purpose I have shown a headed stud 64 secured to member 61 and operating in a slot 62ᵇ in member 62, a spring 65 interposed between the head on said stud and member 62 serving normally to retain said members in coöperative relation and juxtaposition. The member 62 has one or more angularly disposed fingers 66, projecting inwardly beyond the inner member 61 and adapted to engage the tuck portion 4ᵃ of flap 4ᵇ, while the member 61 is adapted to engage the flap 4ᵇ. The angles formed between members 62 and fingers 66 are adapted to coincide with the sharpened or beveled edges 50ᶜ of the flap closer projections 50ᵇ, the upper edges of which latter are shown beveled downwardly and outwardly at 50ᵈ (Figs. 32 and 35), whereby the tuck end 4ᵃ of flap 4ᵇ will be folded along the crease line 4ᵈ (Fig. 37). Member 62 is shown provided with a projection 67 adapted to engage a stop 68 on frame 1 (Figs. 35 and 36) to limit movement toward the carton of member 62, the member 61, however, being permitted to have the desired additional movement toward the carton. Shaft 60 may be rocked by any suitable means in timed relation to the operation of the flap closers 50. For such purpose shaft 60 is shown provided with a crank arm 69 shown pivotally connected with a rod or link 70, which, for convenience of construction and operation, is shown pivotally connected with a crank arm 71, secured on a rock shaft 72 journaled in bearings upon the braces 1ᵇ (Figs. 1, 2, 12 and 13). Shaft 72 may be rocked by means of a crank arm 73, thereon, pivotally connected with a rod 74, depending through the main frame, and provided with a projection or roller 75 coöperating with a cam 76 secured on shaft 21 (Figs. 2, 12 and 13). The arrangement and timing of flap closers 50, 61 and 62 is such that when a carton is brought to rest in operative relation to said flap closers and the flap closers 50 have moved toward each other to close in the flaps 4ᶜ, they will remain temporarily in such position (Fig. 31), and thereupon the flap closers and tuckers 61, 62, which are then over the flap 4ᵃ, 4ᵇ, will be caused to move toward such flap jointly. The fingers 66 then will bear upon the flap toward its outer portion, and will swing it downwardly and bend its tuck end 4ᵃ against the edges 50ᶜ of the flap closers 50, and present the tip of the tuck end 4ᵃ into the end of the carton, the fingers 66 guiding the tuck end to such position (Fig. 35), and thereupon the flap closers 50 will be spread apart leaving the flaps 4ᶜ folded within the then partly closed tuck-end flap 4ᵇ, 4ᵃ. When the projections 50ᵇ have moved away from the carton sufficiently the member 61 will continue to move toward the carton, pushing the tuck end 4ᵃ into the latter and the flap 4ᵇ toward the latter, the fingers 66 then having been brought to rest by the engagement of tongue 67 of member 62 with stop 68, whereupon the parts will assume the position shown in Fig. 36, with the tuck end 4ᵃ tucked within the carton and the flap 4ᵇ closed against the flaps 4ᶜ, retaining the latter closed. The member 61 then will move outwardly, and when it engages member 62 both of said members, together with fingers 66, will be moved back to normal position (indicated in dotted lines in Fig. 35, and in Fig. 13) ready for a succeeding operation, and so on. It will be understood, therefore, that as each carton that has been opened is successively brought to rest opposite the aforesaid flap closers, the flaps 4ᶜ and 4ᵇ will be closed in as described, whereby the previously opened carton having one end closed will be in condition to be charged or filled with the desired contents.

As a convenient means for flaring or spreading the flaps at the opposite ends of the cartons (to enable the more ready charging of the cartons), I have shown flap flaring or spreading means at the ends of the cartons opposite the aforesaid flap closing means, whereby one step or position of the cartons will suffice for the two said objects. Flap flarer or spreader 77 (Figs. 12 and 13) is shown located on the side of the conveyer and receivers opposite the aforesaid flap closers, and said spreader is shown carried by a slidable bar 78 mounted in a bearing 79 provided in or on a support 80 carried by frame 1, whereby the spreader 77 may be reciprocated toward and from the cartons. A crank arm 81 secured to shaft 72 is shown pivotally connected with a link 82 that is pivotally connected at 83 with an arm 84 that is pivotally connected at 85 with bar 78. A spring 86 (Fig. 13) interposed between bar 78 and link 82 normally tends to draw said link relatively to bar 78. Arm 84 is adapted to stop against bar 78 to push said bar rearwardly or to the right in Fig. 13, the arm 84 for such purpose having a stop or abutment 87. The relation of said parts is such that when shaft 72 is rocked to cause the flap closing members 61 and 62 to operate to close flap $4^b$, $4^a$ of the carton, link 82 will be drawn to cause flap flarer 77 to be drawn by spring 86 to resiliently and easily approach the opposing end flaps $4^e$, $4^f$, $4^g$, $4^h$ to flare or spread them outwardly (Figs. 31 and 32), and when shaft 72 rocks reversely link 82 will move outwardly, swinging the arm 84 on its pivot until stop 87 of said arm engages bar 78 to cause withdrawal of the flarer 77 from the flaps of the carton (Fig. 13).

While the receivers or pockets 5 for the cartons may be of any suitable construction, adapted to receive the same and to permit the above described operations on the flaps of the cartons while in such receivers, I have illustrated the receivers as movably supported upon conveyer 6 and adapted to be moved from a substantially horizontal carton receiving position to a substantially vertical position to receive goods therein after the flaps at one end of the cartons have been closed. Said receivers are shown comprising a bottom plate $5^a$ and spaced side members or walls $5^b$ adapted to receive the cartons therebetween, whereby when the cartons are opened and squared in the receivers the cartons will rest upon the plates $5^a$. The receivers are pivotally supported adjacent to one end for which purpose they are shown provided with lugs $5^c$ (Figs. 9, 10, 11), journaled upon shafts 88 that are carried in supports 89 secured upon plates 90 which are spaced apart and secured on conveyer or chain 6 (Figs. 1, 3, 5, 7, 13, 35), whereby the receivers may be tilted or moved from horizontal to vertical positions and vice versa with respect to the conveyer. The closed ends of the receptacles will rest on said plates when the receptacles are charged (Figs. 2 and 5). The plates 90 are guided to slide along spaced longitudinally disposed rails 91 carried by frame 1 (Figs. 12 and 13), whereby the receivers are supported for operations with respect to the cartons thereon. The free ends of the receivers 5 are shown provided with projections 92 adapted, during a portion of the progress of the receptacles or cartons 4 through the machine, to engage the guide 93 supported by the main frame and extending above the conveyer and receivers in a longitudinal direction from a point beyond the aforesaid flap closing and spreading devices (Fig. 1) to a point suitably remote therefrom near the delivery end of the machine (Fig. 2). The guide 93 at its first named end is shown provided with an inclined and suitably shaped portion $93^a$ (Fig. 1) adapted to be engaged by the projections 92 as the conveyer travels to cause said projections to ride up along said part $93^a$ to cause the receivers to be tilted or turned into an upward article-receiving position, and said projections travel along said guide whereby the receivers are retained in such upward position until the projections 92 coöperate with the downwardly projecting portion $93^b$ of said guide (Figs. 2, 5 and 6) for causing the return of the receivers and charged cartons to a substantially horizontal position on the conveyer. After the receivers containing the receptacles or cartons having the closed flaps $4^b$, $4^c$ have been stepped along the machine a suitable distance and turned upwardly, they are brought into relation to means for charging the cartons. At $i$ is indicated a flap spreader shown carried by a rail or bar $j$ supported by frame 1, which spreader is shown located in position to engage and bend outwardly the flaps $4^h$ of the cartons as they advance toward the carton charging devices. In the example illustrated in the accompanying drawings it is to be assumed that the articles to be charged into the cartons are in loose or bulk form, such as candies, to be lifted from a mass and deposited in the successive cartons. The arrangement I have illustrated for such purpose may be described as follows: A receptacle for the articles is indicated at 94 having an open top and shown in communication with a filling chute 95, the parts being supported on the main frame by standards 96 adjacent to the conveyer (Figs. 2, 16 and 17). At 97 is a funnel or chute into which the goods or articles are to be deposited for passage to the open ends of the receptacles or cartons 4 in the receivers. The funnel 97 is supported over the conveyer, and at one side of receptacle 94, and the open upper ends of the cartons are successively brought to rest step by step beneath funnel 97. Rotative scoops 98 are supported to rotate within and through the receptacle 94 to scoop up charges of articles or goods therein, and said scoops are mounted in such manner as to deposit their contents successively in funnel 97. The scoops 98 are secured upon shafts 99 which are journaled to rotate upon a head or disk 100, which is shown provided with spaced bearings 101 for said shafts (Figs. 17 and 18). Head or disk 100 is secured upon a shaft 102 journaled in a bearing on the standard 103 secured upon frame 1 (Figs. 2, 16, 17 and 18). Shaft 102 may be continuously rotated in any suitable manner. I have shown said shaft provided with a gear 104 in mesh with a gear 105 that meshes with a gear 106 secured upon a stub shaft journaled upon standard 103 and carrying a sprocket wheel 107 (Figs. 16 and 17) that receives a chain 108 (Figs. 2 and 16), which may be driven in any suitable manner. A sprocket wheel is indicated at 109 receiving said chain, which sprocket wheel is secured upon shaft 18, (Fig. 2). Means are provided for rocking the shafts 99 on their axes as they are carried around bodily with the scoops by head or disk 100, whereby said scoops will advance into and through the articles or goods in receptacle 94, and when the scoops successively rise to a point just above the top of funnel 97 the scoops will be tilted to deposit the articles in the funnel, and then will be returned to their article-receiving positions during their course back to receptacle 94, the direction of bodily rotation of the scoops being indicated by the arrow in Fig. 2. I have shown each shaft 99 provided with a pinion 110 in mesh with a corresponding rack 111, slidably supported in head or disk 100, and normally pressed toward a cam 112 by a corresponding spring 113 (Fig. 18). A housing 114 for each rack 111 is secured upon head 100, and spring 113 is shown within the housing bearing at one end against head 100 and at the other end against a head upon the corresponding rack 111. Cam 112 is secured in suitable position relatively to head 100, and upon standard 103 (Fig. 17). The arrangement of the parts described is such that as head or disk 100 is rotated the lefthand scoop 98 (Fig. 2) will enter receptacle 94 and be turned into position to receive the articles therein as such scoop passes therethrough, and when the scoop has emerged from the receptacle cam 112 will cause outward sliding of the corresponding rack 111, which, through the associate pinion 110, will rotate the corresponding shaft 99 to cause such charged scoop to tilt over funnel 97 and deposit the contents therein, and thereafter said cam and spring 113 will cause return of said rack to reverse the position of the scoop ready again to enter receptacle 94, and so on for each rotation of the scoop. Since several scoops 98 are illustrated as carried by head or disk 100 each of such scoops will be operated in manner last described in successive order, to successively deposit charges of articles in funnel 97. The operation of depositing articles from the scoops into funnel 97 is timed with respect to the stopping of the successive open ended receptacles or cartons 4 beneath the funnel for the deposit of each scoopful of goods in successive cartons.

In order to have the scoops discharge successively substantially equal quantities of articles for the successive receptacles or cartons 4, I provide means to level off the articles in the scoops after the latter have passed out of the bulk of articles in receptacle 94, and before discharge of articles from the scoops into funnel 97. For such purpose I have shown a brush $a$ (Fig. 2) carried by a shaft $b$ journaled upon an arm or bracket $c$ shown carried by chute 95, the brush being in position to rock back and forth over the scoops successively. An arm $d$ connected with shaft $b$ is shown connected with a rod or link $e$ which is shown provided with a forked end at $f$ slidable upon shaft 18 and having a projection or roller $g$ coöperative with cam $18^a$ (Fig. $2^a$) whereby, when said cam rotates, the brush will be rocked. Each time that a scoopful of articles rises adjacent to the brush and just before the scoop is rotated to discharge the articles into funnel 97, the brush will be rocked across the upper edge of the scoop to level off the articles therein to prevent an excess of articles from being discharged from the scoop at different times, measured charges thus being provided.

While a funnel having a single outlet for articles or goods will suffice to direct the successive charges to the successive receptacles or carton 4, I have provided a funnel 95 having a plurality of outlets $97^a$, $97^b$, spaced in such positions as to register with two cartons simultaneously, whereby articles deposited by a scoop in the funnel may find their way into both legs of the funnel in accordance with the manner in which the articles drop into the funnel, and I have provided means whereby the charge from a single scoop will eventually be deposited in a single carton and not in two different cartons. For such purpose I have shown the leg $97^c$ of the funnel provided with two valves or throttles 115 and 116, one above the other (Fig. 20), and operative alternately to close and open passage through the respective portions of leg $97^c$. For such purpose the valve 115 is shown mounted upon a shaft 117 journaled in leg $97^c$ and shown provided with a pinion 118 in mesh with a rack 119, and valve 116 is provided with a pinion 120 in mesh with said rack (Fig. 2). The valves 115 and 116 are shown set at a right angle with respect to each other so that when one valve is closed the other will be open. Rack 119 may be operated by a cam 121 secured on shaft 21 and receiving a projection 122 from said rack (Fig. 2) whereby the rack will be reciprocated. The timing of valves 115 and 116 is such that when a scoop 98 deposits a charge of goods in funnel 97 the receptacle or carton 4 to receive such charge will be beneath leg $97^d$ of the funnel, and valve 115 then will be closed and valve 116 will be open (Fig. 20). When a charge is received in the funnel, if all of the charge does not pass through leg 97ᵈ to the aforesaid carton part of the charge will so do and the remaining portion of the charge will enter leg 97ᵉ and rest upon valve 115. During the time that said carton is stepping from leg 97ᵈ to position under leg 97ᵉ, or when it rests under the latter leg and before another charge enters the funnel, the valves 115, 116 will be operated, the latter closing the lower portion of leg 97ᵉ and the former opening to permit the goods thereon to drop upon the then closed valve 116 (see dotted lines in Fig. 20). Before the next charge is received in the funnel and while the aforesaid carton is beneath leg 97ᵉ, said valves will be reversed in position, the valve 116 opening to deposit the goods thereon in said carton, while valve 115 closes to receive part of the succeeding charge in the funnel, and at such time another empty carton will have been brought to rest beneath leg 97ᵈ ready to receive the succeeding charge or part thereof in manner before described. From the foregoing it will be understood that while a carton requires at least two steps or positions beneath the funnel, for receiving a full charge, the operation is not delayed, but on the contrary is expedited, because it requires less time for a portion of the charge to flow through leg 97ᵈ than for a full charge so to do, and by dividing the delivery of the charge for a carton from one step into a plurality of steps, the danger that some of the goods might not pass through the funnel into the carton before the latter is moved or stepped along is avoided, in proportion to the speed of the machine.

It is sometimes desirable to place paper linings within cartons or containers within which the articles are to be charged, and for such purpose I provide means shown located between the carton opening devices and the carton charging or filling devices for lining the cartons before they are charged. At 125 is indicated a former or guide shown substantially conforming to the shape of the carton and located over the conveyer in register with an open ended carton when it is brought to rest by the conveyer at a point between the previously described flap closers and the charging devices (Figs. 2 and 21 to 24). The guide or former 125 is shown supported upon a standard or upright 126 mounted on frame 1. Said guide is shown provided with a suitably extended plate or head 127 upon which strips or sheets of paper 128 are to be laid for forming linings for the cartons, said strips or sheets to be laid successively on plate 127 over the upper end of guide or former 125. At 129 is a plunger mounted over guide or former 125 adapted to reciprocate therein to push the strips of paper 128 into said guide or former. Plunger 129 is shown carried by an arm 130 extending from a reciprocative tubular rod 131 that is guided in upright or standard 126 (Figs. 2, 7 and 21). Any suitable means may be provided to reciprocate rod or tube 131, for which purpose I have shown the latter provided with a projection or pin 132 receiving the slotted end 133ᵃ of a lever 133 that is pivotally supported at 134 upon frame 1, as upon bracket 135. Lever 133 is provided with a projection or roller 136 coöperative with a cam 137 secured upon shaft 21 (Figs. 2 and 7), whereby the tube or rod 131 is reciprocated. When a strip of paper 128 is placed upon table 127 and the plunger 129 descends it will first push said paper into guide 125, thus folding the paper into form substantially as shown in Figs. 21 and 27, and a continued depression of the paper thus folded through said guide will cause it to encounter a pair of spaced folders 138 within guide 125, between which the plunger passes with the paper, causing the bottom 128ᵃ of the folded paper on opposite sides first to be bent upwardly and inwardly, as illustrated at 128ᵇ in Fig. 28. The plunger then will continue through the guide propelling the paper with it, and opposite corners of the paper will engage diagonally disposed folders 139 within the guide beyond folders 138, causing the vertical edge portions 128ᶜ of the strip to be folded against the ends of the plunger. Farther downward movement of the plunger with the partially folded strip 128 will cause the remaining edge portions 128ᵈ of the strip to be folded over the parts 128ᶜ thereof (as in Fig. 29) by engagement with diagonally disposed folders 140 within guide 125 beyond folders 139, to finally form the lining. A continued movement of the plunger then will carry the folded lining into receptacle or carton 4 then beneath guide 125, as indicated in Fig. 21, the folded portions 128ᵈ of the lining remaining in contact with the folders 140 until the lining emerges from guide 125. In order to permit ready withdrawal of the plunger from within the lining and carton I provide a stripper shown in the form of a rod 141 slidable in a longitudinal bore in the plunger and provided with a suitable lower head 142, the plunger and stripper having movement together on the operating stroke and independently of one another on the return stroke. The stripper rod 141 is shown connected with an arm 143 carried by rod 144 shown reciprocative within the bore of tubular rod 131. The lower end of rod 144 is shown provided with a projection 145 operative in the slotted end 146ᵃ of lever or arm 146, pivotally supported upon bracket 135 and provided with a pin or projection 147 coöperative with an appropriate portion or surface of cam 137 (Fig. 7). The arrangement of cam 137 is such that it will cause plunger 129 and stripper 141 to descend together to push strip 128 through guide 125 and into carton 4, and then the plunger will rise while the stripper remains set to retain the lining at the bottom of the carton, and after a suitable upward stroke of the plunger the stripper will also rise free of the lining and return to the normal position relatively to the plunger ready for a further downward operation. After the lining has been placed in the carton and the plunger and stripper have receded therefrom, the lined carton may be stepped along the conveyer to receive the charge of goods in manner before described.

The strips 128 for the linings may be fed to plate 127 in any suitable manner, either manually or automatically. I have shown means for feeding a continuous strip of paper upon plate 127 step by step and for cutting off therefrom lengths suitable for the successive linings 128. Means for such purpose may be described as follows: Adjacent to plate 127 a pair of coöperative rolls A B are journaled to feed a strip 128$^a$ from a suitable reel, which strip may pass to the rolls A B from a guide C. Roll A may be rotated by any suitable means, such as by means of gears D, E respectively on the shaft of roll A and on a shaft F (Fig. 2) journaled in suitable bearings on frame 1. The shaft F is shown provided with a gear G in mesh with a gear H secured on shaft 21. A cutter or knife I, pivotally supported at J to extend transversely with respect to the path of travel of strip 128$^a$, may be operated in any suitable manner to successively cut off lengths of the strip 128$^a$ for the linings 128. Suitable means for feeding and cutting off lengths of strip 128$^a$ may be found more fully set forth in Letters Patent No. 1,151,233 issued to me Aug. 24, 1915.

While the machine may be provided with means for lining the cartons, machines embodying other features of my invention may be made without the means for lining the cartons, or machines having the lining devices may be used for opening, charging and closing cartons without inserting linings therein. In either event, after the cartons have been charged with articles or goods, the flaps 4$^e$, 4$^f$, 4$^g$, 4$^h$ of the cartons may be closed, and if desired, certain of such flaps may be sealed before the cartons are discharged from the machine. I have illustrated means for closing the flaps 4$^e$, 4$^f$ in advance of closing the flap 4$^g$ of the carton, or while the charged carton is passing through the machine in an upright position, and for finally closing the flap 4$^h$ substantially while the carton is being turned down to a substantially horizontal position for delivery from the machine. At a suitable position along frame 1 beyond the charging funnel 97 is located a rocking flap closer 160, which is shown carried by a rock shaft 161 journaled upon an upright 162$^a$ carried by frame 1, flap closer 160 being supported to depend over the traveling cartons and in the path of over the end flaps 4$^e$, 4$^f$ of the cartons. Shaft 161 may be rocked by any suitable means (Figs. 2, 5 and 6). I have shown said shaft provided with a crank arm 162 pivotally connected by a link 163 with a rock arm 164 secured upon a shaft 165 journaled on a bracket 166 carried by frame 1 (Fig. 2). Shaft 165 is shown provided with an arm 167 connected by a rod or link 168 with lever 55 whereby as shaft 165 is rocked the flap closer 160 will be correspondingly rocked. At one side of the rocking closer 160 is a stationary flap closer 170 located above the line of travel of the cartons in position to engage the carton flaps 4$^e$, 4$^f$ (Figs. 2 and 5). In Fig. 6 the closer 160 is shown provided with a recess 160$^a$ at one end adapted to receive the tip end of closer 170 when closer 160 rocks toward the same. The closer 170 is shown supported by an upright 171 secured on frame 1. The arrangement described is such that when a vertically disposed carton having its flaps disposed upwardly (Fig. 14) advances so that its flap 4$^e$ encounters the flap closer 160 (in its raised dotted position shown in dotted lines in Fig. 5), said flap will slip under said closer and will be bent toward a closed position by said closer and will encounter the stationary closer 170, which will close flap 4$^e$ over the carton as the latter proceeds as indicated in Fig. 5. When the opposing flap 4$^f$ passes under closer 160 in the dotted position of said closer shown in Fig. 5, such flap will snap under said closer, and after the flap passes beyond the right-hand end of said closer (Fig. 5) and the carton comes to rest, said closer will be rocked to fold the flap 4$^f$ down on the carton so that when the carton next steps to the right in Fig. 5 both of the flaps 4$^e$ and 4$^f$ will be retained closed by the stationary closer 170. During the last named step and some succeeding steps of the carton the flap 4$^g$ will encounter a stationary flap closer 172, which is suitably supported upon frame 1 and spaced from closer 170. The flap receiving end 172$^a$ of closer 172 is so curved as to cause said flap 4$^g$, when received in an upright position, to be turned down over the previously closed flaps 4$^e$, 4$^f$, said flap 4$^g$ continuing to be moved under the extended portion of closer 172, which is so shaped as to keep flap 4$^g$ closed and the flap 4$^h$ upwardly disposed by engagement with the edge of closer 172 during certain further progress of the carton. While the flap 4$^g$ is passing under the flap closer 172, which keeps the flaps 4$^e$, 4$^f$ and 4$^g$ closed and the flap 4$^h$ extended, the receiver 5 containing the corresponding carton is caused to swing down upon the conveyer to a substantially horizontal position. This is accomplished by means of a plate or strip 173 shown extending from rail $j$, which strip bears against the back of the carton and is shaped in curved form substantially corresponding with the delivery portion $93^b$ of guide 93 (Fig. 6) to cause the carton and carrier 5 to be swung back upon corresponding plate 90 of the carrier, the flap $4^h$ at such time remaining unfolded and projecting outwardly from the carton. After the carton and its carrier have been turned down upon the conveyer, as stated, the inner surface of flap $4^h$ may be supplied with paste. Flap pasting devices may be provided in any suitable manner, as for instance, as shown in the aforesaid Letters Patent granted to me No. 1,151,233. In the example illustrated in the accompanying drawings I have shown a flap paster 174 adapted to reciprocate in a paste receptacle 175 carried by frame 1 (Figs. 2 and 4). The flap paster may be carried by a rod 176 extending upwardly therefrom and connected by an arm 177 with a reciprocative rod 178 guided downwardly through frame 1, and operatively connected by a link 179 (Fig. 2) with a rock arm 180 secured on shaft 165, whereby the paster 174 will be reciprocated. Each time a carton is brought to rest above the paster with flap $4^h$ extending outwardly, the paster will rise to apply paste to the inner face of the flap and will then descend into the paste pot, and so on for each succeeding flap. After the flaps $4^h$ have been pasted they are to be closed over the previously closed flaps at the same end of the cartons, and for such purpose I have shown a guide rail 182 along which pasted flaps $4^h$ slide and provided with a downwardly tapered portion $182^a$ extending below a suitably shaped flap-closing guide 183 carried by frame 1 and shown having a curved receiving edge $183^a$ (Figs. 3, 4, 41 and 42), whereby the flaps $4^h$ of the cartons, as the latter travel, will be turned down and closed against the previously closed flaps $4^g$ to be pasted thereto. Closer 183 extends a suitable distance along the machine parallel to the ends of the cartons to keep the flaps $4^h$ for a suitable period pressed against the flaps $4^g$ as the cartons progress to the delivery part of the machine. Spaced from the flap turner and closer 183, and at the ends of the cartons opposite the flaps $4^h$, is a guide 184 suitably supported by frame 1, the flap closer 183 and guide 184 being curved downwardly just outside of wheel 8 to guide the closed cartons to the delivery devices. A cover member 185 is shown pivotally supported at 186 and overlying the cartons as they travel between the parts 183 and 184, retaining said cartons in their receivers. Since cover 185 is hinged it may be lifted for access to cartons and may swing when cartons are drawn away from their receivers 5.

Cartons may be delivered from the receivers by any suitable means. I have shown a pair of fingers 187 spaced apart at the ends of the cartons (Figs. 3, 4 and 10), the hook-ends $187^a$ of which fingers are adapted to slide along the closed ends of the cartons and to snap behind the same, whereby when the fingers are moved in the direction away from the conveyer 6, the cartons will be pulled from the receivers 5 and deposited upon a guideway 188 between spaced guides 189 carried by frame 1. The fingers 187 are supported upon a reciprocative slide 190 suitably guided upon rails 191 carried by the main frame, (Figs. 3 and 4). Rods 192 are shown located at opposite ends of slide 190 and said rods are pivotally connected at 193 with said slide (Figs. 3 and 4), and at their other ends said rods are connected with rock arms 194 pivotally supported upon frame 1 at 195, which arms 194 are connected by one or more links 196 with one or more rock arms 197 which may be secured upon shaft 165 (Fig. 2), whereby when said shaft rocks the slide 190 and the fingers 187 will be correspondingly reciprocated to discharge the charged and closed cartons successively from the conveyer to the guide 188, from which the cartons may be removed in any suitable manner.

The complete operation of the machine may be described as follows: A stack of collapsed cartons will be placed in magazine 3 to rest upon feeding plate 10, a suitable quantity of goods will be placed in receptacle 94, and, if the cartons are to be lined, the paper $128^a$ for the lining strips 128 will be fed upon plate 127. When the machine is started, the endless conveyer will travel in the direction of the arrow in Fig. 1, step by step, and each time a receiver 5 stops in position under the delivery end of plate 10 the latter will be withdrawn from under a carton retained by fingers 23, whereupon the carton will drop in the corresponding receiver beneath the same. Each time a carton is brought to rest opposite an opener 30 the latter will advance into the carton, will be rotated therein to square and seat the carton in the receiver, and will be withdrawn therefrom. When the opened carton stops opposite the flap closers 50, 61 and 62 the closers 50 will operate to close in the flaps $4^c$ and the flap closer and tucker 61, 62 will operate to close flap $4^b$ and tuck its end $4^a$ within the carton, and the flap flarer or spreader 77 will operate to flare or spread the flaps at the opposite end of the carton. If linings are to be placed in the cartons the strips 128 will be successively fed over table or plate 127 and cartons will be successively brought to rest beneath guide 125, whereupon plunger 129 will descend to insert the linings in the cartons and will be withdrawn therefrom and the cartons will come to rest successively beneath the funnel 97. If linings are not to be placed in the cartons the operations of feeding strips to table or plate 127 and the operations of plunger 129 will be omitted. Each time a carton comes to rest under the leg 97$^d$ of the funnel a scoop 98 will deposit a charge in the funnel, and when such partly charged carton comes to rest beneath the leg 97$^c$ of the funnel the remaining portion of the charge of such carton will be deposited in the latter. As the charged carton is carried along by the conveyer its flap 4$^e$ first will be turned down by contact with the flap turner 170 and the carton will come to rest, whereupon flap turner 160 will turn in the flap 4$^f$. During further progress of the carton the flap 4$^g$ will be turned down over the flaps 4$^e$, 4$^f$ by the flap turner 172, and as such carton proceeds it will be turned down horizontally upon the conveyer by means of the guides 93 and 173 and will be brought to rest over the pasters. Thereupon paster 174 will rise to apply paste to the inner face of flap 4$^h$, and then the carton will be advanced and its pasted flap will be turned down against the flap 4$^g$ by the flap turners 182 and 183, and when the completed carton is carried over the wheel 8 in its receiver, the fingers 187 will advance, engage and withdraw the carton from the receivers, depositing the carton upon the guide 188. Succeeding cartons will be pushed along said guide 188 by fingers 187 to propel cartons along the guideway. It will be understood that the various operations described proceed in a substantially simultaneous manner upon various portions of succeeding cartons, as the conveyer moves step by step, resulting in the final delivery of the opened, charged and closed cartons.

While I have referred to receptacles 4 as cartons having flaps at opposite ends, it will be understood that my improvements are not limited in their entirety to use in conjunction with the receptacles or cartons shown, as they may be of any desired shape and dimensions, and my improved means for lining the receptacles or cartons as well as for charging them may be utilized in machines in which previously opened cartons are supplied ready to be lined or charged, or both, since so far as the operation of the aforesaid receptacle lining and charging devices are concerned opened receptacles or cartons of any desired size may be fed to the lining and charging devices manually or by any suitable means.

I have referred to the parts 98 as scoops adapted to pass through the mass or bulk of articles into receptacle 94, yet such scoops are in reality measure instrumentalities adapted to pick up substantially measured quantities of loose articles for the successive charges for the receptacles or cartons 4.

Having now described my invention what I claim is:—

1. A machine of the class described comprising means to supply and open receptacles successively, means to supply articles in bulk, means to feed said receptacles successively in position to receive said articles, and means to enter said articles in bulk and scoop therefrom definite charges of said articles and deliver them successively into said receptacles.

2. A machine of the class described comprising means to supply and open receptacles successively, means to supply articles in bulk, means to feed said receptacles successively in position to receive said articles, means to enter said articles in bulk and scoop therefrom definite charges of said articles and deliver them successively into said receptacles, and means to close the open ends of the charged receptacles.

3. A machine of the class described comprising means to supply receptacles, means to open the receptacles, means to supply articles in bulk, means to move said open receptacles step by step in position to receive said articles, and means to enter said articles in bulk and scoop therefrom definite charges of said articles and deliver them successively into said receptacles.

4. A machine of the class described comprising means to supply receptacles, means to open the receptacles, means to advance the opened receptacles step by step, means to close flaps at one end of said receptacles, means to supply articles in bulk, means to move said receptacle step by step in position to receive said articles, and means to enter said articles in bulk and scoop therefrom definite charges of said articles and deliver them successively into the open ends of said receptacles.

5. A machine of the class described comprising means to supply receptacles, means to open the receptacles, means to advance the opened receptacles step by step, means to close flaps at one end of said receptacles, means to supply articles in bulk, means to move said receptacle step by step in position to receive said articles, means to enter said articles in bulk and scoop therefrom definite charges of said articles and deliver them successively into the open ends of said receptacles, and means to close flaps at said open ends of the charged receptacles.

6. A machine of the class described comprising a conveyer having receivers spaced apart, means pivotally supporting the receivers adjacent to one end upon the conveyer to be turned upwardly thereon, means to supply collapsed receptacles successively to said receivers, means to open the receptacles in said receivers, means to close flaps at one end of said receivers, means to turn said receivers and receptacles to an upward position, the conveyer having means to oppose the ends of the receptacles when they are upward thereon, and means to charge articles into the open ends of said receptacles.

7. A machine of the class described comprising a conveyer having receivers spaced apart, means pivotally supporting the receivers adjacent to one end upon the conveyer to be turned upwardly thereon, means to supply collapsed receptacles successively to said receivers, means to open the receptacles in said receivers, means to close flaps at one end of said receivers, means to turn said receivers and receptacles to an upward position, the conveyer having means to oppose the ends of the receptacles when they are upward thereon, means to charge articles into the open ends of said receptacles, and means to close flaps at the open ends of the charged receptacles while extending in an upward direction.

8. A machine of the class described comprising a conveyer having receivers spaced apart, means pivotally supporting the receivers adjacent to one end upon the conveyer to be turned upwardly thereon, means to supply collapsed receptacles successively to said receivers, means to open the receptacles in said receivers, means to close flaps at one end of said receivers, means to turn said receivers and receptacles to an upward position, the conveyer having means to oppose the ends of the receptacles when they are upward thereon, means to charge articles into the open ends of said receptacles, means to close flaps at the open ends of the charged receptacles while extending in an upward direction, means to return said receivers and charged receptacles to a substantially horizontal position, and means to close final flaps on the receptacles while in the last named position.

9. The combination of means for supporting receptacles having projecting flaps, with a flap closer having a finger adapted to engage the tuck end of one of said flaps to bend it and direct it toward the open end of the receptacle, said closer having a member operative independently of said finger to close said flap against the receptacle and push its tuck end therein.

10. The combination of means for supporting receptacles having projecting flaps, with a flap closer having a finger adapted to engage the tuck end of one of such flaps to direct it toward the open end of the receptacle, an abutment to oppose the flap and cooperative with said closer whereby the tuck end of the flap will be folded relatively to said abutment, means to withdraw said abutment from the flap, and means to close said flap against the receptacle and push its tuck end therein.

11. The combination of means for supporting receptacles having projecting flaps, with a two-part flap closer, means to cause said parts to be moved jointly toward said flaps for a distance, and one of said parts to move farther separately from the other part to close the flaps against the receptacles.

12. The combination of means for supporting receptacles having projecting flaps, with a two-part flap closer, means to cause said parts to be moved jointly toward said flaps for a distance, and one of said parts to move farther separately from the other part to close the flaps against the receptacles, one of said parts having a finger adapted to engage the tuck ends of flaps to bend them and direct them toward the receptacle for entrance therein.

13. The combination of means for supporting receptacles having projecting flaps, with a two-part flap closer, means to cause said parts to be moved jointly toward said flaps for a distance, and one of said parts to move farther separately from the other part to close the flaps against the receptacles, one of said parts having a finger adapted to engage the tuck ends of flaps to bend them and direct them toward the receptacle for entrance therein, and means to stop the movement toward the receptacle of one of said parts and permit continued movement toward the receptacle of the other of said parts.

14. The combination of means for supporting receptacles having projecting flaps, with a two-part flap closer, means to cause said parts to be moved jointly toward said flaps for a distance, and one of said parts to move farther separately from the other part to close the flaps against the receptacles, one of said parts having a finger adapted to engage the tuck ends of flaps to bend them and direct them toward the receptacle for entrance therein, an abutment adapted to coact with the flap closer to cause folding of the tuck end of the flap, and means to present said abutment opposite the closer and withdraw it therefrom.

15. The combination of means for supporting receptacles having projecting flaps, with a two-part flap closer, resilient means to retain said parts operatively associated to cause them to move together, means to operate said closer, and means to limit movement of one of said parts toward the receptacle, said resilient means permitting the other part to move independently a farther distance toward the receptacle.

16. The combination of means for supporting receptacles having projecting flaps, with a two-part flap closer, resilient means to retain said parts operatively associated to cause them to move together, means to operate said closer, and means to limit movement of one of said parts toward the receptacle, said resilient means permitting the other part to move independently a farther distance toward the receptacle, one of said parts having a finger to bend the tuck ends of the flaps to direct their tuck ends for entrance into the receptacles.

17. The combination of means for supporting receptacles having projecting flaps, with a two-part flap closer, resilient means to retain said parts operatively associated to cause them to move together, means to operate said closer, means to limit movement of one of said parts toward the receptacle, said resilient means permitting the other part to move independently a farther distance toward the receptacle, an abutment to oppose flaps of said receptacles, and means to present said abutment opposite said flaps and withdraw it therefrom, one of said parts having a finger to bend the tuck ends of the flaps against said abutment, to direct said tuck ends for entrance into the receptacles.

18. The combination of means for supporting receptacles having projecting flaps, with flap closers adapted to close opposing flaps, means to move said closers toward and from said flaps, a flap closer having fingers to engage the tuck ends of flaps to fold them over the first named closers and direct the tuck ends toward the open ends of the receptacles, and means to move the second named flap closer toward and from the receptacle.

19. The combination of means for supporting receptacles having projecting flaps, with flap closers adapted to close opposing flaps, means to move said closers toward and from said flaps, a two-part flap closer, means to cause said parts to be moved jointly toward flaps of such receptacles for a distance to fold said flaps over the first named flap closers, and means to permit one part of said two-part flap closer to move farther separately from the other part to close said flaps against the receptacles.

20. The combination of means for supporting receptacles having projecting flaps, with flap closers adapted to close opposing flaps, means to move said closers toward and from said flaps, a two-part flap closer, resilient means to cause them to move together, means to move said two-part closer toward flaps of said receptacles after the first named closers have closed flaps of the receptacles, means to limit movement of one of said parts toward the receptacle, said resilient means permitting the other part to move independently a farther distance toward the receptacle after the first named closers have moved therefrom.

21. The combination of means for supporting receptacles having projecting flaps, with flap closers adapted to close opposing flaps, means to move said closers toward and from said flaps, a two-part flap closer, resilient means to cause them to move together, means to move said two-part closer toward flaps of said receptacles after the first named closers have closed flaps of the receptacles, means to limit movement of one of said parts toward the receptacle, said resilient means permitting the other part to move independently a farther distance toward the receptacle after the first named closers have moved therefrom, one of said parts having fingers to bend the tuck ends of the second named flaps over the first named closers to direct said tuck ends for entrance into the receptacles.

22. The combination of means for supporting receptacles having flaps projecting from opposite ends, with a flap closer adjacent to one end of the receptacles, means pivotally supporting said closer to move toward and from the receptacles to close flaps thereof, a flap flarer opposing the opposite end of said receptacles, means movably supporting said flarer, a crank arm connected with the flap closer, a crank arm movably connected with the flap flarer, means connecting said crank arms, and means for operating one of said crank arms whereby the flap closer and the flap flarer will be moved toward and from opposite ends of the receptacles.

23. The combination of means for supporting receptacles having projecting flaps, a pair of flap closers, means pivotally supporting said closers to move toward and from each other to fold opposing flaps of the receptacles, said closers having inclined portions and edges to coact with flaps for folding their tuck ends toward the receptacles, with a two-part flap closer, resilient means to retain said parts operatively associated to cause them to move together, one of said parts having fingers to bend the tuck ends of the flaps against said edges of said closers to direct said tuck ends for entrance into the receptacles, and a stop for said part having fingers whereby the other part of said two-part closer may close the corresponding flaps and push their tuck ends into the receptacles after the first named closers have moved therefrom.

24. The combination of means for supporting receptacles having flaps projecting from opposite ends, with a flap closer adjacent to one end of the receptacles, means pivotally supporting said closer to move toward and from the receptacles to close flaps thereof, a flap flarer opposing the opposite end of said receptacles, means movably supporting said flarer, a crank arm connected with the flap closer, a second crank arm movably connected with the flap closer, an arm movably connected with the second named crank arm and with the flap flarer, means to limit movement of the third named arm relatively to the flap flarer, and means to rock said arm for moving the flap closer and flap flarer toward and from opposite ends of the receptacle.

25. The combination of means for supporting receptacles having flaps projecting from opposite ends, with a flap closer adjacent to one end of the receptacles, means pivotally supporting said closer to move toward and from the receptacles to close flaps thereof, a flap flarer opposing the opposite end of said receptacles, means movably supporting said flarer, a crank arm connected with the flap closer, a second crank arm movably connected with the flap closer, an arm movably connected with the second named crank arm and with the flap flarer, means to limit movement of the third named arm relatively to the flap flarer, a spring operatively interposed between the second named crank arm and the flap flarer, to draw the latter, and means to rock said arms for moving the flap closer and flap flarer toward and from opposite ends of the receptacle.

29. A machine of the class described comprising means to supply receptacles, means to open the receptacles, means to tuck flaps at one end of each receptacle, means to charge said receptacles through the opposite ends, and means to close the flaps at the last named ends of said receptacles.

27. A machine of the class described comprising means to supply receptacles, means to open the receptacles, means to close flaps at one end of each receptacle, means to measure full charges for the receptacles, means to divide said charges and deposit them in the receptacles each in a multiple of steps, and means to close the remaining flaps of said receptacles.

28. A machine of the class described comprising means to supply receptacles, means to open the receptacles, means to close flaps at one end of each receptacle, means to advance the receptacles step by step, means to measure full charges for the receptacles, means to divide said charges and deposit part thereof in the receptacles through their open ends at one step and to complete the deposit of such charges at another step, and means to close flaps at the last named ends of said receptacles.

29. A machine of the class described comprising means to supply receptacles, means to open the receptacles, means to tuck flaps at one end of each receptacle, means to charge said receptacles through the opposite ends, means to close flaps at the last named ends of said receptacles, and means to seal said closed flaps.

30. A machine of the class described comprising means to supply receptacles, means to open the receptacles, means to insert liners in said receptacles, means to charge said lined receptacles through their opposite ends, and means to close flaps at the last named ends of said receptacles.

31. A machine of the class described comprising means to supply receptacles, means to open the receptacles, means to close flaps at one end of said receptacles, means to insert liners through the open ends of said receptacles, means to charge said lined receptacles through their open ends, and means to close flaps at the last named ends of said receptacles.

32. A machine of the class described comprising means to supply receptacles in one position, means to open receptacles, means to close flaps at one end of the receptacles, means to change the plane of said receptacles, means to insert liners in said receptacles through their open ends, and means to close the last named ends of said receptacles.

33. A machine of the class described comprising means to open receptacles in one position, means to change the plane of said receptacles, means to insert liners in said receptacles, and means to close flaps at the charging ends of said receptacles.

34. A machine of the class described comprising means to open receptacles in one position, means to change the plane of said receptacles, means to insert liners in said receptacles, means to charge said lined receptacles, and means to close flaps at the charging ends of said receptacles.

35. A machine of the class described comprising means to erect receptacles, means to insert liners in the receptacles, means to charge the receptacles, means to tuck flaps at one end of the receptacles, and means to seal flaps at the other end of the receptacles.

36. A machine of the class described comprising means to erect receptacles, means to tuck flaps at one end of the receptacles, means to charge the receptacles through the opposite ends, means to partially close flaps at the last named ends of the receptacles, and means to entirely close flaps at said end of said receptacles.

37. A machine of the class described comprising means to open receptacles in one position, means to tuck flaps at one end of said receptacles, means to change the plane of said receptacles, means to charge the receptacles in the last named position, means to partially close flaps at the charged ends of the receptacles, and means to return the receptacles to the original plane.

38. A machine of the class described comprising means to open receptacles in one position, means to tuck flaps at one end of said receptacles, means to change the plane of said receptacles, means to charge the receptacles in the last named position, means to partially close flaps at the charged ends of the receptacles, means to return the receptacles to the original plane, and means to close the remaining flaps of the receptacles while on such plane.

39. A machine of the class described comprising means to open receptacles in one position, means to tuck flaps at one end of the receptacles, means to flare flaps at the other end of the receptacles, means to insert linings in the receptacles through the last named ends, means to charge said lined receptacles through the last named ends, and means to close flaps at the last named ends of said receptacles.

40. A machine of the class described comprising means to open receptacles in one position, means to tuck flaps at one end of the receptacles, means to flare flaps at the other end of the receptacles, means to insert linings in the receptacles through the last named ends, means to charge said lined receptacles through the last named ends, means to close flaps at said end of said receptacles, and means to seal flaps at the last named ends of said receptacles.

41. A machine of the class described comprising means to supply receptacles, means to open the receptacles, means to tuck flaps at one end of each receptacle, means to change the plane of said receptacles, and means to charge said receptacles.

42. A machine of the class described comprising means to supply receptacles, means to open the receptacles, means to tuck flaps at one end of each receptacle, means to change the plane of said receptacles, means to charge said receptacles, and means to close flaps at the charging ends of said receptacles.

Signed at New York city, in the county of New York, and State of New York, this 19th day of March, A. D. 1917.

ERNEST D. ANDERSON.